Sept. 7, 1965 C. F. HOBSON, JR 3,205,410
PANEL ASSEMBLY COMPRISING ELECTRIC CIRCUIT BREAKERS AND FUSES
Filed June 7, 1963 2 Sheets-Sheet 1

INVENTOR.
CHARLES F. HOBSON, JR.
BY Robert F. Casey
ATTORNEY

Sept. 7, 1965　　　　C. F. HOBSON, JR　　　　3,205,410
PANEL ASSEMBLY COMPRISING ELECTRIC CIRCUIT BREAKERS AND FUSES
Filed June 7, 1963　　　　　　　　　　　　2 Sheets-Sheet 2

INVENTOR.
CHARLES F. HOBSON, JR.
BY Robert F. Casey
ATTORNEY

United States Patent Office 3,205,410
Patented Sept. 7, 1965

3,205,410
PANEL ASSEMBLY COMPRISING ELECTRIC
CIRCUIT BREAKERS AND FUSES
Charles F. Hobson, Jr., Southington, Conn., assignor to
General Electric Company, a corporation of New York
Filed June 7, 1963, Ser. No. 286,300
1 Claim. (Cl. 317—114)

The present invention relates to the electric circuit protective apparatus, and particularly to such apparatus which includes contact-type circuit protective devices combined with fuse-type circuit protective devices.

The adequate protection of electrical circuits of moderate to high nominal capacity, such for example as 100 to 1500 amperes capacity, requires that such circuits be protected against three types of abnormal current conditions. The first type of such condition is the sustained moderate overload condition which gradually builds up heat in the circuit to a point which may cause damage to the conductors. Such a moderate overload may, for example, be from 125% to 300% of the normal current carrying capacity of such conductors. The second type of abnormal current conditions is the moderate short-circuit having a value from about 3 to 10 times the normal current carrying capacity of the conductors. The third condition is the extreme high short-circuit condition involving potential currents of from 10 to 1000 times the normal current carrying capacity of the conductor. In circuit breakers of the type referred to herein, such high short-circuit currents are in the neighborhood of 50,000 to over 100,000 amperes.

While "current limiting" type fuses are capable of providing protection against all three types of abnormal current conditions, they do not provide the desired switching function, and also, they require replacement after each operation, even after operation on overload or moderate short-circuit conditions. Since the likelihood of high short-circuit current conditions occurring is extremely small, it is customary to utilize for the protection of such circuits, a combination of contact operating type devices with "current limiting" type fuses.

In accordance with the prior art, such combinations have been provided in either of two arrangements. The first arrangement is merely a series-connected combination of current limiting fuses and contact operating circuit breakers. The second type of arrangement includes specially built contact-operating type circuit breakers having a portion of the housing thereof adapted to receive current limiting type fuses which are connected electrically in series with the contact operating device, and which fuses include a plunger to cause the tripping of the breaker when the fuse blows.

Each of these arrangements, however, involves serious difficulties for the user of such devices in the installation, connection and use of such devices. These difficulties arise from the fact that the enclosures, mounting dimensions, and connection arrangements, of apparatus such as switchboards and panelboards, adapted to receive such protective devices are, for historical and practical reasons, specifically tailored to the size, dimensions, and connection arrangements of such contact-operating circuit breakers alone.

When current limiting type fuses are connected electrically in series with contact-operating type circuit breakers, the switchboards and panelboards must be specially modified to receive, mount, and connect such fuses in spaces ordinarily occupied by circuit breakers. This involves additional expense and time.

Arrangements utilizing integrally constructed contact operating type circuit breakers and current limiting fuses likewise require special adaptation of switchboard and panelboard assemblies, in order to accommodate the increased size of the circuit breaker casing incorporating such current limiting fuses.

It is an object of the present invention to provide means whereby current limiting fuses may be utilized in conjunction with contact operating type circuit breakers without special modification of the apparatus adapted to receive such circuit breakers.

It is another object of the invention to provide means whereby combined contact operating type circuit breakers and current limiting fuses may be utilized in the same apparatus without special modification to receive, mount, and connect, such current limiting fuses.

Other objects of the invention will in part become obvious, and in part be set forth in the following detailed description, taken in conjunction with the specification, and the scope of the invention may be set forth in the appended claim.

Figure 1:
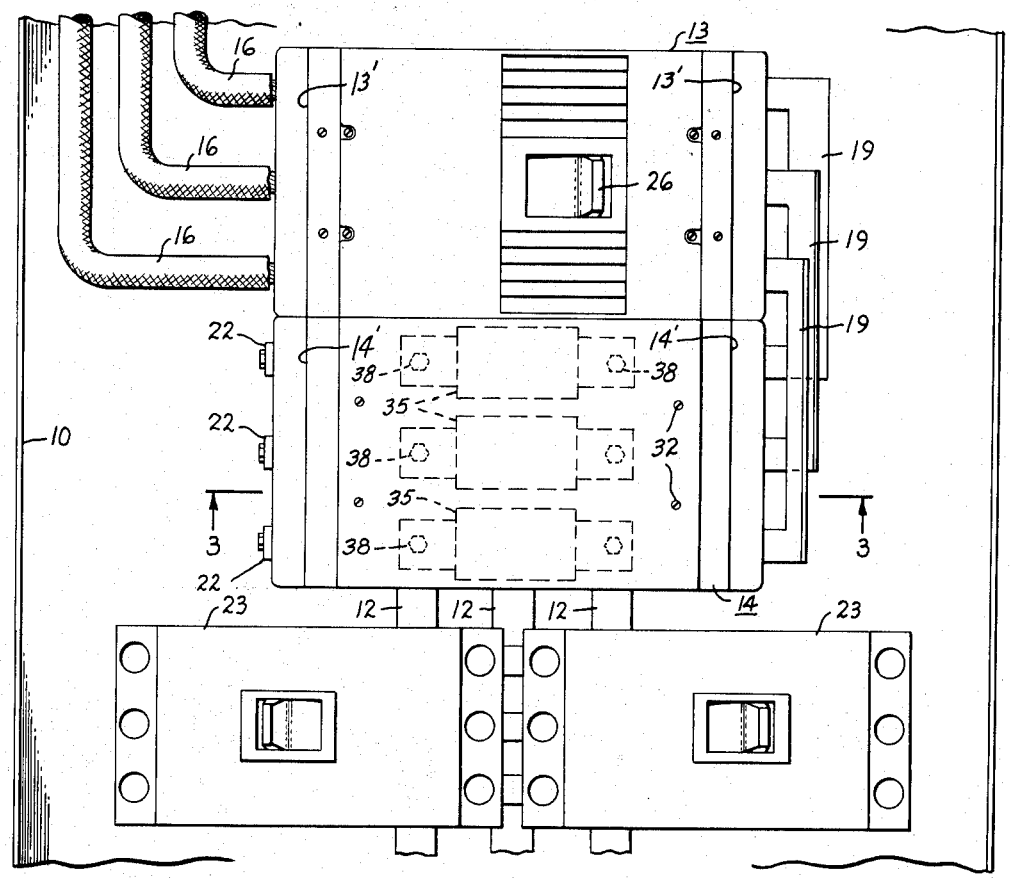
FIGURE 1 is a plan view of a portion of an electric panelboard embodying the invention.

Referring to the drawings, the invention is shown in FIGURE 1 as embodied in a panelboard incorporating a metallic cabinet or enclosure 10 comprising an elongated rectangular box-like metallic enclosure adapted to be utilized with similar sections, and having three vertically extending power supply bus bar conductors 12 mounted therein by suitable insulating means, not shown. The enclosure 10, in use, is closed by a suitable cover, not shown.

For the purpose of energizing the power supply bus bars 12, and for disconnecting power therefrom upon the occurrence of predetermined current conditions, there is provided electric circuit protective apparatus comprising a contact-operating type main circuit breaker 13, combined with a fuse assembly 14, in accordance with the invention.

The circuit breaker 13 has its input terminals connected, by means of flexible cables 16, to a suitable 3-phase power source, not shown.

The circuit breaker 13 has its output terminals connected by means of jumper straps 19 to input terminals of the fuse assembly 14. The fuse assembly 14, in turn, has its output terminals connected, by means of connecting straps 22, (see FIGURE 2), to the vertical bus bars 12.

The panelboard 10 also includes branch circuit controlling devices comprising electric circuit breakers 23, which are mounted and connected by suitable means, not shown, to the vertical bus bars 12 and which include output terminals, not shown, for connection to branch circuit conductors which supply power to various power consuming devices.

The power flow, therefore, is as follows: in through the flexible cables 16 to the circuit breaker 13, through the breaker 13, through the jumper straps 19 to the fuse assembly 14, through the fuse assembly 14 to the vertical supply bus bars 12, from the vertical bus bars 12 to the branch circuit controlling circuit breakers 23, and thence to the power consuming devices, not shown.

Figure 2:
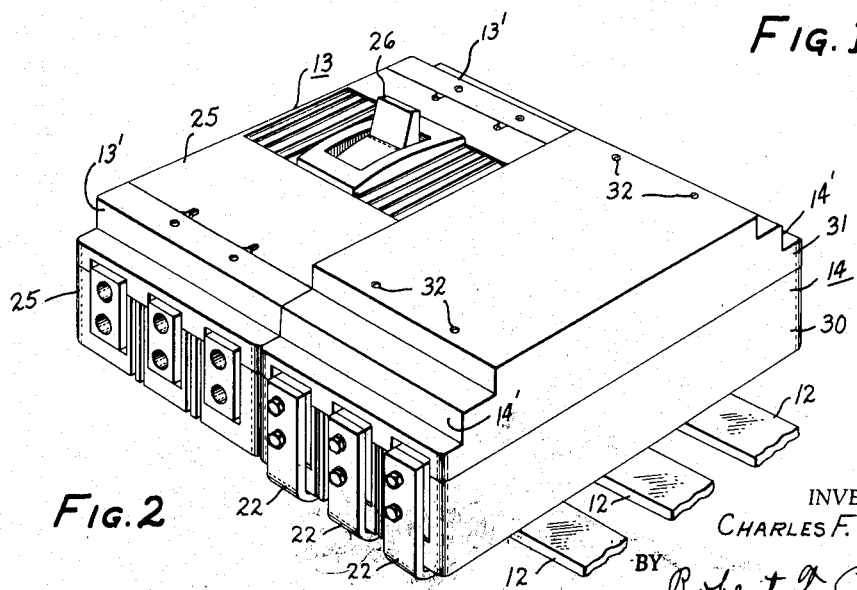
FIGURE 2 is a perspective view of a portion of the apparatus of FIGURE 1.
Figure 3:
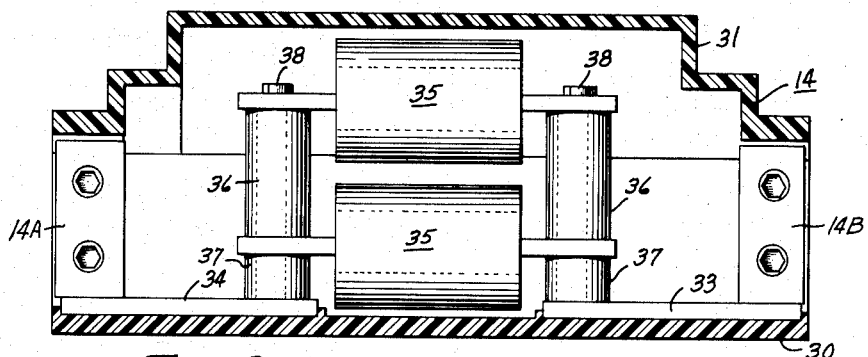
FIGURE 3 is a sectional elevation view of a portion of the apparatus of FIGURE 1 taken generally on the line 3—3 of FIGURE 1.
Figure 4:
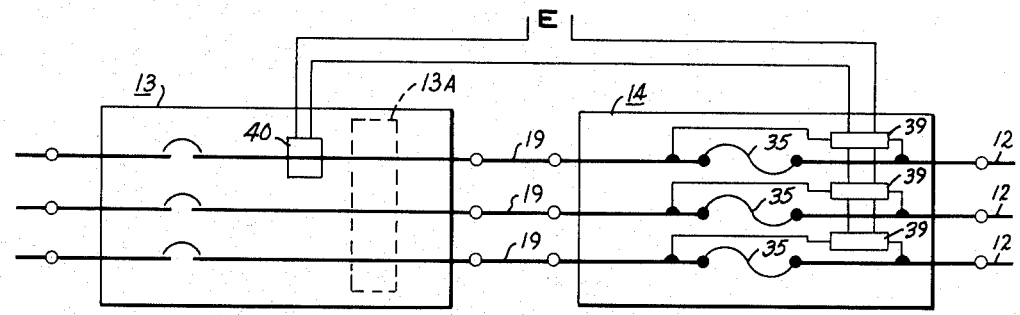
FIGURE 4 is a schematic diagram of the electrical connections of one form of the invention.

Referring now to FIGURES 2 and 3, the circuit breaker 13 comprises a generally box-like rectangular insulating enclosure 25, enclosing automatically operable contact mechanism, not shown, which is adapted to be manually operated by means of the handle member 26 projecting through an aperture in the upper wall thereof, and which may be automatically released to open the circuit, by means of current responsive mechanism, indicated generally at 13A in FIGURE 4.

The electric circuit breaker 13, may be of any suitable type, such, for example, as shown in Patent No. 2,921,169 issued January 12, 1960 to E. B. Judd, et al., and assigned to the same assignee as the present invention.

The fuse assembly 14 includes an insulating casing 30 generally similar in outlet to the insulating case 25 of the circuit breaker 13, and including a removable cover portion 31 retained in place by suitable means such as by screws 32. As shown in FIGURE 3, the enclosure 30 contains a line terminal strap 33 and a load terminal strap 34. Connected between the line and load terminal straps 33, 34 are a plurality of current limiting fuses 35. In the embodiment illustrated, each pair of line and load terminal straps 33, 34, has a pair of current limiting fuses 35 connected therebetween, electrically in parallel. For the purpose of facilitating the connection of the fuses 35, two pairs of spacers 36, 37 are provided, to which the terminals of the fuse 35 are connected by suitable means such as by bolts 38.

In FIGURE 4 there is illustrated a modification of the invention in which means is provided for causing tripping or automatic opening of the circuit breaker 13 in the event that one or more of the fuses 35 blows. Accordingly, relays 39 are provided connected electrically in parallel with the fuses 35 so as to be actuated when the corresponding fuse blows. Each of the relays 39 carries a pair of contacts, not shown, adapted to complete a circuit to the solenoid 40 contained in the circuit breaker 13 which is disposed and arranged to engage a portion of the trip unit 13A to cause tripping of the circuit breaker. A solenoid of the type described is shown for example in Patent No. 2,912,544 issued November 10, 1959 to B. A. Piteo, Jr., et al., and assigned to the same assignee as the present invention.

Figures 5A, 5B:
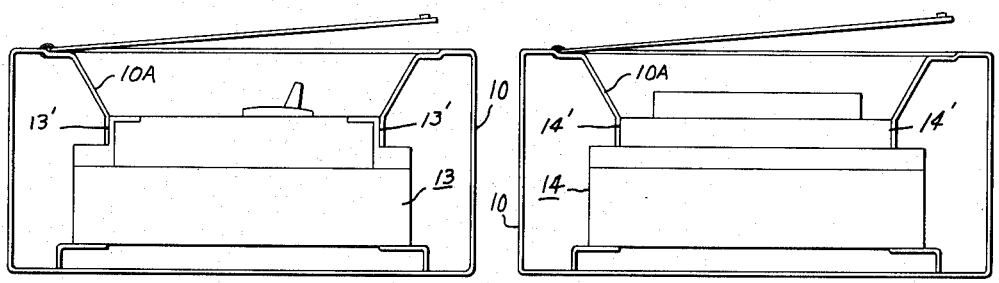
FIGURE 5A is a sectional view of a typical panelboard, showing the mounting arrangements of a typical circuit breaker.
FIGURE 5B is a sectional view similar to FIGURE 5A showing the mounting arrangements of a fuse assembly constructed in accordance with the invention.

In accordance with the invention, the enclosure 30 of the fuse assembly 14 has substantially the same dimensions as the enclosure 25 of the circuit breaker 13, in a direction transversely of the bus bars 12. Thus, for example, the distance between the shoulders 13' of the circuit breaker 13 and the shoulders 14' of the fuse assembly 14 are substantially equal. Thus openings which are provided in front cover or "trim" plates 10A which fit the circuit breaker casing 13 will likewise fit the fuse carrier enclosure 30, see FIGURES 5A and 5B.

It will also be observed that the fuse assembly 14 includes terminals 14A, 14B, as shown in FIGURE 3 which are substantially identical to the corresponding terminals of the circuit breaker 13. In addition, the terminal straps 33, 34 can readily receive other kinds of lugs which are commonly used with circuit breakers. The dimensional and terminal similarity between the two devices also makes it extremely convenient to use existing circuit breaker hardware in making connections to the fuse carrier assembly, such as panelboard straps, switchboard studs or connectors, plug-in bases, etc.

It will also be readily apparent that differing size fuses can be enclosed within the same enclosure 30. Thus one size enclosure for the assembly 14 can be used to fill the needs of a range of fuse sizes by merely providing different mounting holes in the terminal straps 33–44. It will also be obvious that since the fuses are, in accordance with the invention, contained in a separate enclosure, this enclosure can be mounted directly adjacent the circuit breaker as in the illustrated embodiment, or it can be mounted elsewhere within the panelboard or switchboard as may be convenient.

By providing fuse assemblies for use with a given circuit breaker including fuses mounted within an enclosure having the same general outer dimensions as the corresponding circuit breaker, therefore, there is provided a convenient and extremely effective means for using combinations of circuit breakers and fuses in existing apparatus which has been designed for circuit breakers alone.

Electric circuit breakers such as circuit breaker 13 are often used in panelboards and switchboards with the automatic-opening means thereof omitted, and in such cases are known as "non-automatic circuit breakers." It will be readily apparent that the present invention is equally useful in combinations including such non-automatic circuit breakers as with conventional automatic opening circuit breakers.

While the invention has been shown in only one particular embodiment, it will be readily apparent that many modifications thereof may readily be made, and I therefore intend by the appended claim to cover all such modifications as fall within the true spirit and scope of the invention.

What I claim as new and desire to secure by Letters Patent of the United States is:

Electric circuit protective apparatus comprising:
 (a) an enlongated metallic main enclosure;
 (b) three power supply bus bars extending longitudinally of said section and substantially centrally thereof;
 (c) an electric circuit breaker having a casing of insulating material having a pair of opposed terminal ends, said terminal ends being spaced apart a distance substantially greater than the width of said circuit breaker;
 (d) means supporting said circuit breaker transversely of said power supply bus bars;
 (e) an electric fuse assembly comprising a generally rectangular insulating enclosure having a pair of opposed terminal ends, said terminal ends being spaced apart a distance substantially equal to the distance between said terminal ends of said circuit breaker, said fuse assembly being positioned in said main enclosure with said terminal ends of said fuse housing in alignment with said terminal ends of said circuit breaker;
 (f) means connecting one of terminal ends of said circuit breaker to a first terminal end of said fuse assembly, means connecting the other terminal end of said fuse assembly to said power supply bus bars,
 (g) a plurality of electric fuses contained in said fuse assembly and connected electrically between said terminal ends of said fuse assembly, and
 (h) a plurality of branch protecting circuit breakers supported in said main enclosure and each having one end thereof electrically connected to said power supply bus bars, whereby said branch protecting circuit breakers draw power from said power supply bus bars which in turn draw their power through said fuses and through said circuit breaker in series relation;
 (i) said circuit breaker housing and said fuse assembly housing having substantially equal dimensions along a plane extending perpendicular to said secondary power supply bus bars, whereby said fuse assembly housing has its major portions in alignment with said housing of said circuit breaker.

References Cited by the Examiner

UNITED STATES PATENTS

| | | | |
|---|---|---|---|
| 2,641,636 | 6/53 | Born et al. | 317—120 X |
| 2,846,545 | 8/58 | Edmunds | 200—133 |
| 2,905,791 | 9/59 | Edmunds | 200—116 |
| 2,924,688 | 2/60 | Edmunds | 200—114 X |
| 2,928,997 | 3/60 | Edmunds | 200—116 |
| 2,939,936 | 6/60 | Dean | 200—1 |
| 2,950,370 | 8/60 | Swain | 200—114 |
| 3,009,035 | 11/61 | Reichert et al. | 200—114 |

BERNARD A. GILHEANY, *Primary Examiner.*

ROBERT K. SCHAEFER, *Examiner.*